US012359931B2

(12) United States Patent
Higuchi et al.

(10) Patent No.: US 12,359,931 B2
(45) Date of Patent: Jul. 15, 2025

(54) PROVIDING INFORMATION TO NAVIGATE TO A PARKING SPACE PREFERRED BY AN OPERATOR OF A VEHICLE

(71) Applicant: Toyota Motor Engineering & Manufacturing North America, Inc., Plano, TX (US)

(72) Inventors: Takamasa Higuchi, Mountain View, CA (US); Kentaro Oguchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 454 days.

(21) Appl. No.: 17/532,094

(22) Filed: Nov. 22, 2021

(65) Prior Publication Data

US 2023/0160709 A1 May 25, 2023

(51) Int. Cl.
*G01C 21/34* (2006.01)
*G06K 9/00* (2022.01)
(Continued)

(52) U.S. Cl.
CPC ..... *G01C 21/3484* (2013.01); *G01C 21/3476* (2013.01); *G01C 21/3492* (2013.01);
(Continued)

(58) Field of Classification Search
CPC ............ G01C 21/3484; G01C 21/3476; G01C 21/3492; G01C 21/3685; G06Q 30/04;
(Continued)

(56) References Cited

U.S. PATENT DOCUMENTS 10,755,570 B1 * 8/2020 Zhou .................. B62D 15/0285
10,896,609 B2 1/2021 Higuchi et al.
(Continued)

OTHER PUBLICATIONS

Higuchi et al., "Systems and Methods for Learning Driver Parking Preferences and Generating Parking Recommendations," Filed Jun. 30, 2021, U.S. Appl. No. 17/364,111.
(Continued)

*Primary Examiner* — Nga X Nguyen
(74) *Attorney, Agent, or Firm* — Christopher G. Darrow; Darrow Mustafa PC (57) ABSTRACT

A system for providing information to navigate to a parking space preferred by an operator of a vehicle can include a processor and a memory. The memory can store a preliminary operations module and a communications module. The preliminary operations module can include instructions that cause the processor to obtain, for the operator: (1) a first model for a first duration between a commencement of a parking space identification process and a first threshold and (2) a second model for a second duration between the first threshold and a second threshold. The communications module can include instructions that cause the processor to communicate, to a component of the vehicle for an action, information to navigate to the parking space. The parking space can be identified, in response to a current time being within: (1) the first duration, by the first model and (2) the second duration, by the second model.

20 Claims, 4 Drawing Sheets

(51) Int. Cl.
  *G06Q 30/04* (2012.01)
  *G06V 20/58* (2022.01)
  *G08G 1/01* (2006.01)
  *G08G 1/14* (2006.01)

(52) U.S. Cl.
  CPC .......... *G06Q 30/04* (2013.01); *G06V 20/586* (2022.01); *G08G 1/0129* (2013.01); *G08G 1/143* (2013.01); *G06Q 2240/00* (2013.01)

(58) Field of Classification Search
  CPC ............ G06Q 2240/00; G06V 20/586; G06V 10/70; G08G 1/0129; G08G 1/143; G08G 1/0112; G08G 1/144; G08G 1/146; G08G 1/147; G08G 1/148; G08G 1/096833
  See application file for complete search history.

(56) References Cited

U.S. PATENT DOCUMENTS

| | | |
|---|---|---|
| 11,081,004 B1 | 8/2021 | Higuchi et al. |
| 2012/0161986 A1 | 6/2012 | Amir |
| 2016/0117925 A1 | 4/2016 | Akavaram et al. |
| 2016/0171891 A1* | 6/2016 | Banatwala ............. G08G 1/144 340/932.2 |
| 2016/0210860 A1 | 7/2016 | Belzner et al. |
| 2017/0103654 A1 | 4/2017 | Gaebler et al. |
| 2020/0150682 A1 | 5/2020 | Donnelly et al. |
| 2020/0239004 A1 | 7/2020 | Sobhany |
| 2020/0307554 A1* | 10/2020 | Lai ...................... G06V 20/582 |
| 2020/0334985 A1* | 10/2020 | Zhou ........................ G08G 1/14 |
| 2021/0019671 A1 | 1/2021 | Cao et al. |
| 2021/0133603 A1 | 5/2021 | Zhu et al. |
| 2021/0191407 A1* | 6/2021 | Benisch ................. G06N 20/00 |
| 2023/0177958 A1* | 6/2023 | Higuchi ............. G01C 21/3815 |
| 2023/0242098 A1* | 8/2023 | Chen ..................... B60W 30/06 701/24 |

OTHER PUBLICATIONS

Higuchi et al., "A Collaborative Approach to Finding Available Parking Spots," in Proceedings of the 2019 90th IEEE Vehicular Technology Conference (VTC2019—Fall), 2019, pp. 1-5.

Higuchi et al., "Monitoring Live Parking Availability by Visionbased Vehicular Crowdsensing," in Proceedings of 2020 IEEE Global Communications Conference (GLOBECOM), 2020, pp. 1-5.

* cited by examiner

PROVIDING INFORMATION TO NAVIGATE TO A PARKING SPACE PREFERRED BY AN OPERATOR OF A VEHICLE

TECHNICAL FIELD

The disclosed technologies are directed to providing information to navigate to a parking space preferred by an operator of a vehicle.

BACKGROUND

An operator of a vehicle often can have an opinion about a parking space that is preferred by the operator. Such an opinion can be associated with at least one of one or more characteristics about an area designated for parking, one or more characteristics about one or more parking spaces of the area designated for parking, or the like. In order for the vehicle to be parked in a parking space that is preferred by the operator, information about statuses of parking spaces in the area designated for parking can be obtained to ascertain which of the parking spaces are unoccupied. For this purpose, a parking guidance and information system can cause information about the parking spaces of the area designated for parking to be presented to the operator. The area designated for parking can be, for example, a parking garage, a parking lot, a side of a road, or the like. The information about the parking spaces, presented to the operator, can change dynamically as a count of the parking spaces that are unoccupied changes. Often, such a parking guidance and information system can include an array of sensors disposed on infrastructure associated with the area designated for parking. The sensors can be, for example, ultrasound detectors, camera-based sensors, or the like. A sensor, of the array of sensors, can be configured to detect if a corresponding parking space, of the parking spaces in the area designated for parking, is occupied by a vehicle or unoccupied.

SUMMARY

In an embodiment, a system for providing information to navigate to a parking space preferred by an operator of a vehicle can include a processor and a memory. The memory can store a preliminary operations module and a communications module. The preliminary operations module can include instructions that, when executed by the processor, cause the processor to obtain, for the operator of the vehicle: (1) a first model for a first duration between a commencement of a parking space identification process and a first threshold and (2) a second model for a second duration between the first threshold and a second threshold. The communications module can include instructions that, when executed by the processor, cause the processor to communicate, to a component of the vehicle for an action, the information to navigate to the parking space. The parking space can be identified, in response to a current time being within: (1) the first duration, by the first model and (2) the second duration, by the second model.

In another embodiment, a method for providing information to navigate to a parking space preferred by an operator of a vehicle, can include obtaining, by a processor and for the operator of the vehicle: (1) a first model for a first duration between a commencement of a parking space identification process and a first threshold and (2) a second model for a second duration between the first threshold and a second threshold. The method can also include communicating, by the processor and to a component of the vehicle for an action, the information to navigate to the parking space. The parking space can be identified, in response to a current time being within: (1) the first duration, by the first model and (2) the second duration, by the second model.

In another embodiment, a non-transitory computer-readable medium for providing information to navigate to a parking space preferred by an operator of a vehicle can include instructions that, when executed by one or more processors, cause the one or more processors to obtain, for the operator of the vehicle: (1) a first model for a first duration between a commencement of a parking space identification process and a first threshold and (2) a second model for a second duration between the first threshold and a second threshold. The non-transitory computer-readable medium for providing information to navigate to a parking space preferred by an operator of a vehicle can also include instructions that, when executed by one or more processors, cause the one or more processors to communicate, to a component of the vehicle for an action, information to navigate to the parking space. The parking space can be identified, in response to a current time being within: (1) the first duration, by the first model and (2) the second duration, by the second model.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

"Connected vehicle" technologies can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network"

(V2N) technology. "Vehicle to Everything" (V2X) technology can integrate aspects of these individual communications technologies.

The disclosed technologies are directed to providing information to navigate to a parking space preferred by an operator of a vehicle. A first model and a second model can be obtained by a system for providing information to navigate to a parking space preferred by an operator of a vehicle. For example, the parking space can be located in an area designated for parking. For example, the area designated for parking can include one or more of a parking garage, a parking lot, a side of a road, or the like.

For example, one or more of the first model or the second model can have been produced by a machine learning process. The machine learning process can involve an analysis of: (1) past vehicle trajectories associated with parking space identification processes of the operator, (2) durations of the parking space identification processes, and (3) at least one of a characteristic of a past area designated for parking, a characteristic of a past parking space of the past area designated for parking, or the like. Additionally, for example, the machine learning process can further involve an analysis of a status of the past parking space. The status can be one of occupied and unoccupied.

The first model can be for a first duration. The first duration can be between a commencement of a parking space identification process and a first threshold (e.g., one minute). The second model can be for a second duration. The second duration can be between the first threshold (e.g., one minute) and a second threshold (e.g., three minutes). That is, the first model and the second model can be configured to reflect that an opinion about a parking space that is preferred by the operator can change based on a duration of the parking space identification process. For example, the opinion of the operator may be, within the first duration, to park in an unoccupied parking space having a shortest distance between the unoccupied parking space and an entrance of a structure associated with a destination of the operator, but as the parking space identification process extends to be within the second duration, the opinion of the operator may change to park in an unoccupied parking space within a specific distance (e.g., twenty-five meters) of a street light.

For example, information about statuses of parking spaces in the area designated for parking can be obtained by the system. A status, of the statuses, can be one of occupied and unoccupied. For example, based on a current time, the system can execute, for the parking spaces in which the statuses are unoccupied, one or more of the first model or the second model to identify the parking space preferred by the operator of the vehicle. The information to navigate to the parking space can be communicated, to a component of the vehicle for an action. In response to the current time: (1) being within the first duration, the parking space can be identified by the first model and (2) being within the second duration, the parking space can be identified by the second model.

Figure 1:
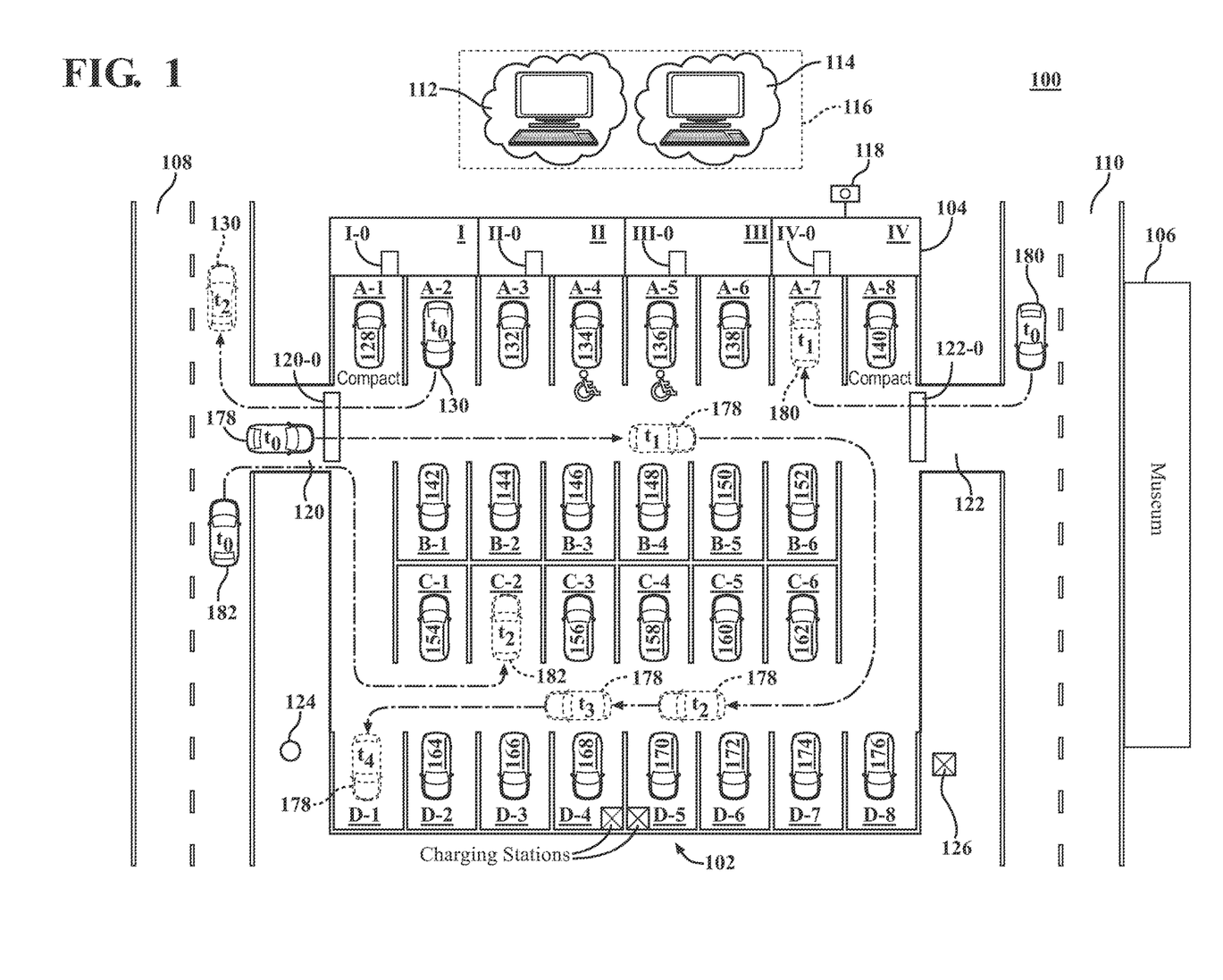
FIG. 1 includes a diagram that illustrates an example of an environment for providing information to navigate to a parking space preferred by an operator of a vehicle, according to the disclosed technologies.

FIG. 1 includes a diagram that illustrates an example of an environment 100 for providing information to navigate to a parking space preferred by an operator of a vehicle, according to the disclosed technologies. For example, the environment 100 can include an area 102 designated for parking, a strip mall shopping center 104, a museum 106, a first road 108, a second road 110, a system 112 for providing information to navigate to a parking space preferred by an operator of a vehicle, and a system 114 associated with the area designated for parking. Alternatively, for example, the system 112 for providing information to navigate to the parking space preferred by the operator of the vehicle and the system 114 associated with the area designated for parking can be included in a combined system 116. For example, the area 102 designated for parking can be at a geographical location that is in a popular neighborhood of a town in which the area 102 designated for parking is located. For example, an average of one or more evaluations of the area 102 designated for parking can be 4.4 stars (out of 5.0 stars).

For example, the area 102 designated for parking can include twenty-eight parking spaces in four rows. From north to south, the four rows can include, for example, a row A, a row B, a row C, and a row D. From west to east, the row A can include, for example, a parking space A-1, a parking space A-2, a parking space A-3, a parking space A-4, a parking space A-5, a parking space A-6, a parking space A-7, and a parking space A-8. For example, the parking space A-1 can be located at a northwest corner of the area 102 designated for parking and can be designated for use by a compact vehicle. For example, the parking space A-4 can be designated for use by a disabled person. For example, the parking space A-5 can be designated for use by a disabled person. For example, the parking space A-8 can be located at a northeast corner of the area 102 designated for parking and can be designated for use by a compact vehicle. From west to east, the row B can include, for example, a parking space B-1, a parking space B-2, a parking space B-3, a parking space B-4, a parking space B-5, and a parking space B-6. From west to east, the row C can include, for example, a parking space C-1, a parking space C-2, a parking space C-3, a parking space C-4, a parking space C-5, and a parking space C-6. From west to east, the row D can include, for example, a parking space D-1, a parking space D-2, a parking space D-3, a parking space D-4, a parking space D-5, a parking space D-6, a parking space D-7, and a parking space D-8. For example, the parking space D-1 can be located at a southwest corner of the area 102 designated for parking. For example, an electrical vehicle charging station can be at the parking space D-4. For example, an electrical vehicle charging station can be at the parking space D-5. For example, the parking space D-8 can be located at a southeast corner of the area 102 designated for parking. For example, dimensions of parking spaces designated for use by a compact vehicle (e.g., the parking space A-1 and the parking space A-8) can be a length of five meters and a width of two-and-a-half meters; dimensions of other parking spaces can be a length of six meters and a width of three meters.

For example, the strip mall shopping center 104 can be disposed along a north end of the area 102 designated for parking. For example, the strip mall shopping center 104 can include, from west to east, a first store I, a second store II, a third store III, and a fourth store IV. For example, the first store I can have an entrance I-0, the second store II can have an entrance II-0, the third store III can have an entrance III-0, and the fourth store IV can have an entrance IV-0. For example, the fourth store IV can have a security camera 118. For example, the parking space A-7, the parking space A-8, and the parking space B-6 can be within a field of view of the security camera 118.

For example, a first entrance 120 of the area 102 designated for parking can be located at a west end of the area 102 designated for parking. For example, the first entrance 120 can be between the row A and the row B. For example, the first entrance 120 can include a first boom gate 120-0 to control access to the area 102 designated for parking from the first road 108. For example, a second entrance 122 of the area 102 designated for parking can be located at an east end of the area 102 designated for parking. For example, the second entrance 122 can be between the row A and the row B. For example, the second entrance 122 can include a second boom gate 122-0 to control access to the area 102 designated for parking from the second road 110. For example, each of the first boom gate 120-0 and the second boom gate 122-0 can be configured to control access to the area 102 designated for parking based upon: (1) a payment of a fee of $X.00 and (2) a time of day being between 7:00 am and 9:00 pm.

For example, the museum 106 can be located east of the second road 110. For example, a street light 124 can be located at the southwest corner of the area 102 designated for parking. For example, an emergency telephone 126 can be located at the southeast corner of the area 102 designated for parking.

Figure 2:
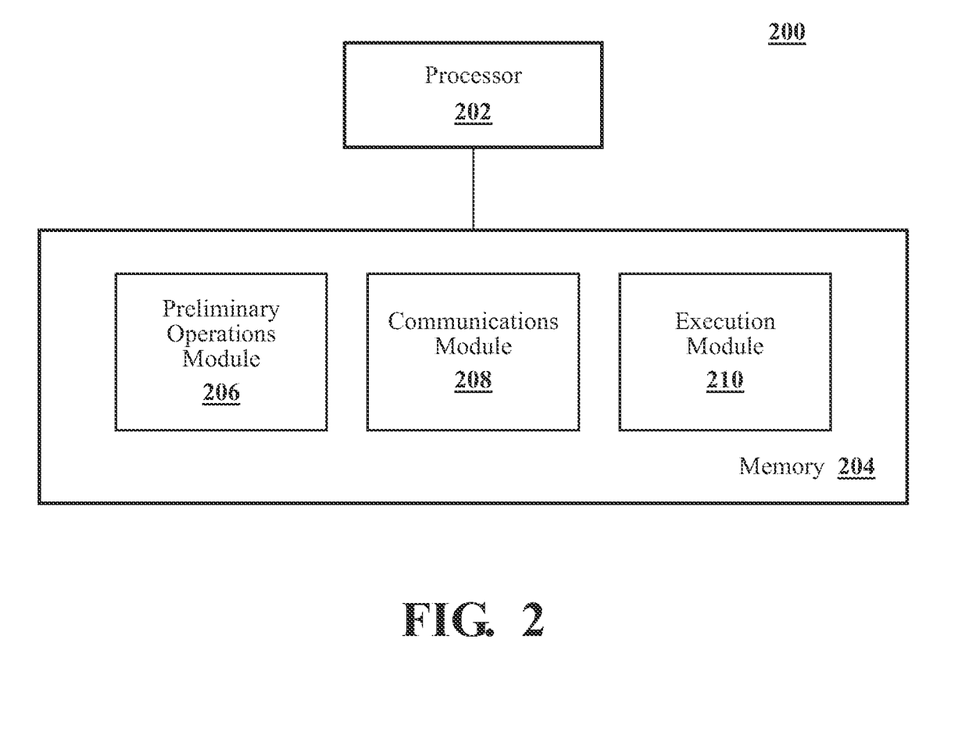
FIG. 2 includes a block diagram that illustrates an example of a system for providing information to navigate to a parking space preferred by an operator of a vehicle, according to the disclosed technologies.

FIG. 2 includes a block diagram that illustrates an example of a system 200 for providing information to navigate to a parking space preferred by an operator of a vehicle, according to the disclosed technologies. For example, the parking space can be located in an area designated for parking. For example, the area designated for parking can be a parking garage, a parking lot, a side of a road, or the like. For example, the area designated for parking can be defined by a geo-fence. For example, the area designated for parking can be the area 102 designated for parking illustrated in FIG. 1.

The system 200 can include, for example, a processor 202 and a memory 204. The memory 204 can be communicably coupled to the processor 202. The memory 204 can store, for example, a preliminary operations module 206 and a communications module 208. For example, the system 200 can be the system 112 illustrated in FIG. 1.

For example, the preliminary operations module 206 can include instructions that function to control the processor 202 to obtain, for an operator of a vehicle: (1) a first model for a first duration between a commencement of a parking space identification process and a first threshold and (2) a second model for a second duration between the first threshold and a second threshold. For example, the commencement of the parking space identification process can be at a time at which the vehicle enters the area designated for parking.

For example, the communications module 208 can include instructions that function to control the processor 202 to communicate, to a component of the vehicle for an action, the information to navigate to the parking space. The parking space can be identified, in response to a current time being within: (1) the first duration, by the first model and (2) the second duration, by the second model. For example, the information to navigate to the parking space can include a location of a specific parking space. For example, such a vehicle can be an automated vehicle. The component can include one or more vehicle systems of the automated vehicle. The one or more vehicle systems can cause the automated vehicle to be navigated to the parking space. Additionally or alternatively, for example, the component can include an output system of such a vehicle. The output system can cause the information to navigate to the parking space to be presented to the operator of the vehicle. For example, the output system can be one or more of a display, a speaker, a haptic device, or the like. For example, the display can be one or more of a console display, a head up display, or the like.

Additionally, for example, the preliminary operations module 206 can further include instructions that function to control the processor 202 to obtain information about statuses of parking spaces in the area designated for parking. A status, of the statuses, can be one of occupied and unoccupied.

Additionally, for example, the memory 204 can further store an execution module 210. For example, the execution module 210 can include instructions that function to control the processor 202 to execute, based on the current time and for the parking spaces in which the statuses are unoccupied, one or more of the first model or the second model to identify the parking space preferred by the operator of the vehicle.

In a configuration, for example, the instructions to obtain the information about the statuses of the parking spaces in the area designated for parking can include instructions to receive, from a system associated with the area designated for parking, the information about the statuses of the parking spaces in the area designated for parking. For example, the system associated with the area designated for parking can be the system 114 illustrated in FIG. 1. For example, a combined system can include the system 200 and the system associated with the area designated for parking. For example, the combined system can be the combined system 116 illustrated in FIG. 1.

In another configuration, for example, the instructions to obtain the information about the statuses of the parking spaces in the area designated for parking can include instructions to determine, from data produced by one or more sensors of the vehicle, the information about the statuses of the parking spaces in the area designated for parking.

In a configuration, for example, the system 200 can be disposed on a server. For example, the server can be associated with the system 112 illustrated in FIG. 1. In this configuration, for example, the instructions to obtain the first model and the second model can include instructions to receive, from the vehicle, the first model and the second model.

In another configuration, for example, the system 200 can be disposed on the vehicle. In this configuration, for example, the instructions to obtain the information about the statuses of the parking spaces in the area designated for parking can include instructions to receive, from a system associated with the area designated for parking, the information about the statuses of the parking spaces in the area designated for parking. For example, the system associated with the area designated for parking can be the system 114 illustrated in FIG. 1.

In a configuration, for example, the instructions to execute the one or more of the first model or the second model to identify the parking space preferred by the operator of the vehicle include instructions to: (1) execute the one or more of the first model or the second model to produce one or more lists of parking spaces, (2) determine, for each parking space on the one or more lists of parking spaces, a value of a utility function associated with the one or more of the first model or the second model, and (3) identify the parking space preferred by the operator of the vehicle as a parking space, of the parking spaces on the one or more lists of parking spaces, for which the value of the utility function is a highest value.

In this configuration, for example, the current time can be a first time. For example, the instructions to identify the parking space preferred by the operator of the vehicle can include instructions to identify a first parking space, of the parking spaces on a first list of parking spaces of the one or more lists of parking spaces, for which the value of the utility function is the highest value. The first list of parking spaces can have been produced from an execution of the first model. For example, the instructions to execute the one or more of the first model or the second model to identify the parking space preferred by the operator of the vehicle can further include instructions to: (1) receive, at a second time, a signal that indicates that the first parking space is occupied and (2) identify, in response to the second time being within: (a) the first duration, the parking space preferred by the operator of the vehicle as a second parking space, of the parking spaces on the first list of parking spaces of the at least one list of parking spaces, for which the value of the utility function is a next highest value less than the highest value and (b) the second duration, the parking space preferred by the operator of the vehicle as a third parking space, of the parking spaces on a second list of parking spaces of the at least one list of parking spaces, for which the value of the utility function is the highest value. The second list of parking spaces can have been produced from an execution of the second model.

With reference to FIG. 1, for example, at a time $t_0$, the parking space A-1 can be occupied by a first vehicle 128, the parking space A-2 can be occupied by a second vehicle 130, the parking space A-3 can be occupied by a third vehicle 132, the parking space A-4 can be occupied by a fourth vehicle 134, the parking space A-5 can be occupied by a fifth vehicle 136, the parking space A-6 can be occupied by a sixth vehicle 138, the parking space A-7 can be unoccupied, the parking space A-8 can be occupied by a seventh vehicle 140, the parking space B-1 can be occupied by an eighth vehicle 142, the parking space B-2 can be occupied by a ninth vehicle 144, the parking space B-3 can be occupied by a tenth vehicle 146, the parking space B-4 can be occupied by an eleventh vehicle 148, the parking space B-5 can be occupied by a twelfth vehicle 150, the parking space B-6 can be occupied by a thirteenth vehicle 152, the parking space C-1 can be occupied by a fourteenth vehicle 154, the parking space C-2 can be unoccupied, the parking space C-3 can be occupied by a fifteenth vehicle 156, the parking space C-4 can be occupied by a sixteenth vehicle 158, the parking space C-5 can be occupied by a seventeenth vehicle 160, the parking space C-6 can be occupied by an eighteenth vehicle 162, the parking space D-1 can be unoccupied, the parking space D-2 can be occupied by a nineteenth vehicle 164, the parking space D-3 can be occupied by a twentieth vehicle 166, the parking space D-4 can be occupied by a twenty-first vehicle 168, the parking space D-5 can be occupied by a twenty-second vehicle 170, the parking space D-6 can be occupied by a twenty-third vehicle 172, the parking space D-7 can be occupied by a twenty-fourth vehicle 174, and the parking space D-8 can be occupied by a twenty-fifth vehicle 176. For example, a twenty-sixth vehicle 178 can be located in the first entrance 120 of the area 102 designated for parking, a twenty-seventh vehicle 180 can be located in a southbound lane of the second road 110, and a twenty-eighth vehicle 182 can be located in a northbound lane of the first road 108.

For example, the time to can be the commencement of the parking space identification process for the operator of the twenty-sixth vehicle 178. When the current time is the time $t_0$, for example, the system 112 can execute the first model for a first list of parking spaces in which the statuses are unoccupied: the parking space A-7, the parking space C-2, and the parking space D-1. For example, the system 112 can determine, for each of these parking spaces, a value of a utility function associated with the first model. For example, the first model can be configured so that values of the utility function can be particularly affected by the distance of a parking space from the entrance of the structure associated with the destination of the operator. For example, the fourth store IV can be the destination of the operator. For example, the system 112 can identify the parking space preferred by the operator of the twenty-sixth vehicle 178 as the parking space A-7, which is the parking space, of the parking spaces on the first list of parking spaces, for which the value of the utility function is the highest value.

However, for example, at a time $t_1$, before the twenty-sixth vehicle 178 can have occupied the parking space A-7, the parking space A-7 can be occupied by the twenty-seventh vehicle 180. Because the time $t_1$ is within the first duration, for example, the system 112 can execute the first model for a second list of parking spaces in which the statuses are unoccupied: the parking space C-2 and the parking space D-1. For example, the system 112 can identify the parking space preferred by the operator of the twenty-sixth vehicle 178 as the parking space C-2, which is the parking space, of the parking spaces on the second list of parking spaces, for which the value of the utility function is the highest value.

However, for example, at a time $t_2$, before the twenty-sixth vehicle 178 can have occupied the parking space C-2, the parking space C-2 can be occupied by the twenty-eighth vehicle 182. Additionally, at the time $t_2$, second vehicle 130 can have exited the area 102 designated for parking so that the parking space A-2 can be unoccupied. Because the time $t_2$ is within the first duration, for example, the system 112 can execute the first model for a third list of parking spaces in which the statuses are unoccupied: the parking space A-2 and the parking space D-1. For example, the system 112 can identify the parking space preferred by the operator of the twenty-sixth vehicle 178 as the parking space A-2, which is the parking space, of the parking spaces on the third list of parking spaces, for which the value of the utility function is the highest value.

However, for example, at a time $t_3$ the first duration can be complete and the second duration can commence. When the current time is the time $t_3$, for example, the system 112 can execute the second model for a fourth list of parking spaces in which the statuses are unoccupied: the parking space A-2 and the parking space D-1. For example, the system 112 can determine, for each of these parking spaces, a value of a utility function associated with the second model. For example, the second model can be configured so that values of the utility function can be particularly affected by the distance of a parking space from a street light. For example, the system 112 can identify the parking space preferred by the operator of the twenty-sixth vehicle 178 as the parking space D-1, which is the parking space, of the parking spaces on the fourth list of parking spaces, for which the value of the utility function is the highest value. For example, at a time $t_4$ the twenty-sixth vehicle 178 can occupy the parking space D-1.

Returning to FIG. 2, in a configuration, for example, one or more of the first model or the second model can have been produced by a machine learning process. For example, the machine learning process can involve an analysis of: (1) past vehicle trajectories associated with parking space identification processes of the operator, (2) durations of the parking space identification processes, and (3) at least one of a characteristic of a past area designated for parking, a characteristic of a past parking space of the past area designated for parking, or the like. For example: (1) commencements of the parking space identification processes can be at times at which one or more vehicles, in which the operator is an operator of the one or more vehicles, enters the area designated for parking and (2) completions of the parking space identification processes can be at times at which a source of a propulsion force for the one or more vehicles is in an off state. For example, a product of the analysis can be training data for the machine learning process.

For example, the machine learning process can further involve an analysis of a status of the past parking space. The status can be one of occupied and unoccupied. Again, a product of the analysis can be training data for the machine learning process. For example, information about the status of the past parking space can be received from a system associated with the past area designated for parking. Additionally or alternatively, the information about the status of the past parking space can be determined from data produced by one or more sensors of the one or more vehicles.

For example, the analysis of: (1) the past vehicle trajectories, (2) the status of the past parking space, (3) the durations of the parking space identification processes, and (4) the characteristic can determine expected values of utility functions of the past parking space in which the status is unoccupied. For example, the analysis can determine the expected values of the utility functions based on a consideration of past vehicle trajectories that included an opportunity to select an unoccupied parking space as the parking space preferred by the occupant of the vehicle, but the opportunity was rejected. A rejection of the opportunity to select such an unoccupied parking space can be indicative of a situation in which the operator has an opinion about such an unoccupied parking space that is lower than an opinion of the operator for one or more other unoccupied parking spaces. For example, the analysis can distinguish the expected values of the utility functions based on associated durations of the parking space identification processes (e.g., the first model can be for the first duration and the second model can be for the second duration).

For example, the characteristic of the past area designated for parking can include one or more of: (1) a count of a total number of parking spaces of the past area designated for parking, (2) a count of a number of the parking spaces for which a status is unoccupied, (3) a count of a total number of electrical vehicle charging stations in the past area designated for parking, (4) a count of a number of the electrical vehicle charging stations in the past area designated for parking that are available for use, (5) a geographical location of the past area designated for parking, (6) a geographical location of an entrance of the past area designated for parking, (7) a geographical location of a point of interest in a vicinity of the past area designated for parking, (8) a fee associated with using the past area designated for parking, (9) a regulation associated with using the past area designated for parking, (10) a measurement of one or more evaluations of the past area designated for parking, (11) an average rate of arrival of vehicles to the past area designated for parking, (12) a measurement of an average size of the parking spaces, (13) a measurement of an ease of use of the parking spaces, (14) a recent history of counts of the number of the parking spaces for which the status is unoccupied, or (15) the like.

With reference to FIG. 1, if the past area designated for parking was, for example, the area 102 designated for parking, then: (1) the count of the total number of the parking spaces of the past area designated for parking can be twenty-eight, (2) the count of the number of the parking spaces for which the status is unoccupied can be, if the information about the status of the past parking spaces was received was like the status of the parking spaces at the time $t_0$, three, (3) the count of the total number of the electrical vehicle charging stations in the past area designated for parking can be two, (4) the count of the number of the electrical vehicle charging stations in the past area designated for parking that are available for use can be, if the information about the status of the past parking spaces was received was like the status of the parking spaces at the time $t_0$, zero, (5) the geographical location of the past area designated for parking can be the popular neighborhood of the town in which the area 102 designated for parking is located, (6) the geographical location of the entrance of the past area designated for parking can be the first entrance 120 of the area 102 designated for parking can be located at the west end of the area 102 designated for parking, (7) the geographical location of the point of interest in the vicinity of the past area designated for parking can be the museum 106 located east of the second road 110, (8) the fee associated with using the past area designated for parking can be the fee of $X.00, (9) the regulation associated with using the past area designated for parking can be that the time of day is between 7:00 am and 9:00 pm, and (10) the measurement of the one or more evaluations of the past area designated for parking can be the average of one or more evaluations of the area 102 designated for parking being 4.4 stars (out of 5.0 stars).

Returning to FIG. 2, for example, the characteristic of the past parking space can include one or more of: (1) the status of the past parking space, (2) a recent history of the status of the past parking space, (3) an estimated time at which the status of the past parking space will be unoccupied, (4) an average rate of arrival of vehicles to the past parking space, (5) an existence of an electrical vehicle charging station at the past parking space, (6) a designation of the past parking space for use by a disabled person, (7) a designation of the past parking space for use by a compact vehicle, (8) a dimension of the past parking space, (9) a geographical location of the past parking space, (10) an existence of the past parking space within a field of view of a security camera, (11) a distance between an entrance of the past area designated for parking and the past parking space, (12) a distance of the past parking space from the security camera, (13) a distance of the past parking space from a street light, (14) a distance of the past parking space from an entrance of a structure associated with a destination of the operator, (15) an existence of a security feature in a vicinity of the past parking space, (16) a feature of the past parking space being that the past parking space is located at a corner of the past area designated for parking, (17) a measurement of an amount of traffic on a segment of a road, the segment being adjacent to the past parking space, (18) a status of a parking space, adjacent to the past parking space, being unoccupied, (19) a measurement of an ease of use of the past parking space, or (20) the like.

With reference to FIG. 1, if the past parking space of the past area designated for parking was, for example: (1) parking space D-1, then the status of the past parking space can be, if the information about the status of the past parking spaces was received was like the status of the parking spaces at the time $t_0$, unoccupied, (2) the parking space D-4, then the existence of an electrical vehicle charging station at the past parking space can be true, (3) the parking space A-4, then the designation of the past parking space for use by a disabled person can be true, (4) the parking space A-1, then the designation of the past parking space for use by a compact vehicle can be true, (5) the parking space D-8, then the dimensions of the past parking space can be a length of six meters and a width of three meters, (6) the parking space D-7, then the geographical location of the past parking space can be the southwest corner of the area 102 designated for parking, (7) the parking space B-6, then the existence of the past parking space within a field of view of a security camera (i.e., the field of view of the security camera 118) can be true, and (8) the parking space A-4, then the distance between an entrance of the past area designated for parking (e.g., the second entrance 122) and the past parking space can be about six meters.

Figure 3:
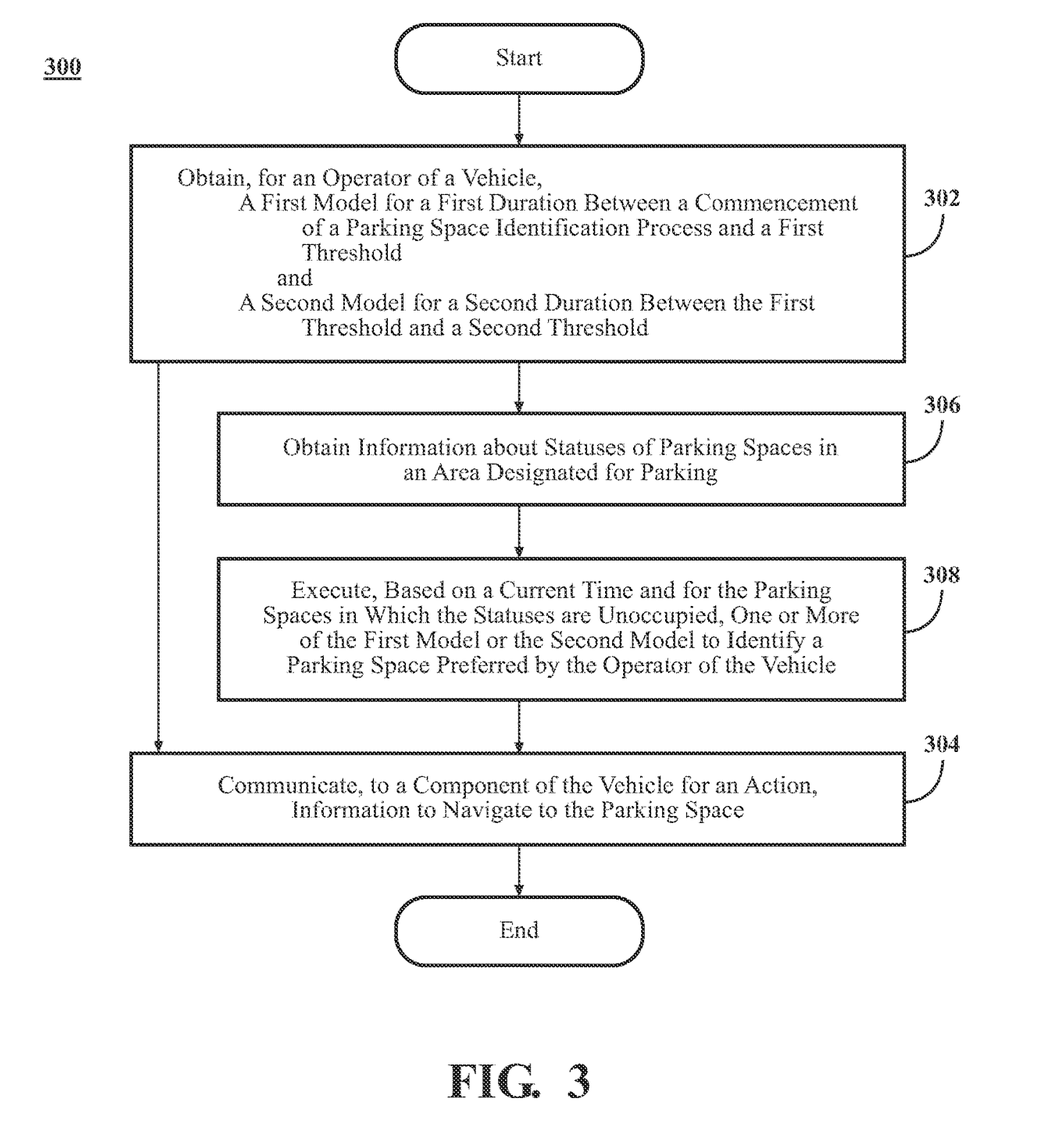
FIG. 3 is a flow diagram that illustrates an example of a method that is associated with providing information to navigate to a parking space preferred by an operator of a vehicle, according to the disclosed technologies.

FIG. 3 is a flow diagram that illustrates an example of a method 300 that is associated with providing information to navigate to a parking space preferred by an operator of a vehicle, according to the disclosed technologies. Although the method 300 is described in combination with the system 200 illustrated in FIG. 2, one of skill in the art understands, in light of the description herein, that the method 300 is not limited to being implemented by the system 200 illustrated in FIG. 2. Rather, the system 200 illustrated in FIG. 2 is an example of a system that may be used to implement the method 300. Additionally, although the method 300 is illustrated as a generally serial process, various aspects of the method 300 may be able to be executed in parallel.

In the method 300, at an operation 302, for example, the preliminary operations module 206 can obtain, for an operator of a vehicle: (1) a first model for a first duration between a commencement of a parking space identification process and a first threshold and (2) a second model for a second duration between the first threshold and a second threshold. For example, the parking space can be located in an area designated for parking. For example, the area designated for parking can be a parking garage, a parking lot, a side of a road, or the like. For example, the area designated for parking can be defined by a geo-fence. For example, the commencement of the parking space identification process can be at a time at which the vehicle enters the area designated for parking.

At an operation 304, for example, the communications module 208 can communicate, to a component of the vehicle for an action, the information to navigate to the parking space. The parking space can be identified, in response to a current time being within: (1) the first duration, by the first model and (2) the second duration, by the second model. For example, the information to navigate to the parking space can include a location of a specific parking space. For example, such a vehicle can be an automated vehicle. The component can include one or more vehicle systems of the automated vehicle. The one or more vehicle systems can cause the automated vehicle to be navigated to the parking space. Additionally or alternatively, for example, the component can include an output system of such a vehicle. The output system can cause the information to navigate to the parking space to be presented to the operator of the vehicle. For example, the output system can be one or more of a display, a speaker, a haptic device, or the like. For example, the display can be one or more of a console display, a head up display, or the like.

Additionally, at an operation 306, for example, the preliminary operations module 206 can obtain information about statuses of parking spaces in the area designated for parking. A status, of the statuses, can be one of occupied and unoccupied.

In a configuration, for example, the preliminary operations module 206 can obtain the information about the statuses of the parking spaces in the area designated for parking by receiving, from a system associated with the area designated for parking, the information about the statuses of the parking spaces in the area designated for parking. For example, a combined system can include a system for providing the information to navigate to the parking space preferred by the operator of the vehicle and the system associated with the area designated for parking.

In another configuration, for example, the preliminary operations module 206 can obtain the information about the statuses of the parking spaces in the area designated for parking by determining, from data produced by one or more sensors of the vehicle, the information about the statuses of the parking spaces in the area designated for parking.

In a configuration, for example, the processor 202 can be disposed on a server. In this configuration, for example, the preliminary operations module 206 can obtain the first model and the second model by receiving, from the vehicle, the first model and the second model.

In another configuration, for example, the processor 202 can be disposed on the vehicle. In this configuration, for example, the preliminary operations module 206 can obtain the information about the statuses of the parking spaces in the area designated for parking by receiving, from a system associated with the area designated for parking, the information about the statuses of the parking spaces in the area designated for parking.

Additionally, at an operation 308, for example, the execution module 210 can execute, based on the current time and for the parking spaces in which the statuses are unoccupied, one or more of the first model or the second model to identify the parking space preferred by the operator of the vehicle.

In a configuration, for example, the execution module 210 can execute the one or more of the first model or the second model to identify the parking space preferred by the operator of the vehicle by: (1) executing the one or more of the first model or the second model to produce one or more lists of parking spaces, (2) determining, for each parking space on the one or more lists of parking spaces, a value of a utility function associated with the one or more of the first model or the second model, and (3) identifying the parking space preferred by the operator of the vehicle as a parking space, of the parking spaces on the one or more lists of parking spaces, for which the value of the utility function is a highest value.

In this configuration, for example, the current time can be a first time. For example, the execution module 210 can identify the parking space preferred by the operator of the vehicle by identifying a first parking space, of the parking spaces on a first list of parking spaces of the one or more lists of parking spaces, for which the value of the utility function is the highest value. The first list of parking spaces can have been produced from an execution of the first model. For example, the execution module 210 can further execute the one or more of the first model or the second model to identify the parking space preferred by the operator of the vehicle by: (1) receiving, at a second time, a signal that indicates that the first parking space is occupied and (2) identifying, in response to the second time being within: (a) the first duration, the parking space preferred by the operator of the vehicle as a second parking space, of the parking spaces on the first list of parking spaces of the at least one list of parking spaces, for which the value of the utility function is a next highest value less than the highest value and (b) the second duration, the parking space preferred by the operator of the vehicle as a third parking space, of the parking spaces on a second list of parking spaces of the at least one list of parking spaces, for which the value of the utility function is the highest value. The second list of parking spaces can have been produced from an execution of the second model.

In a configuration, for example, one or more of the first model or the second model can have been produced by a machine learning process. For example, the machine learning process can involve an analysis of: (1) past vehicle trajectories associated with parking space identification processes of the operator, (2) durations of the parking space identification processes, and (3) at least one of a characteristic of a past area designated for parking, a characteristic of a past parking space of the past area designated for parking, or the like. For example: (1) commencements of the parking space identification processes can be at times at which one or more vehicles, in which the operator is an operator of the one or more vehicles, enters the area designated for parking and (2) completions of the parking space identification processes can be at times at which a source of a propulsion force for the one or more vehicles is in an off state. For example, a product of the analysis can be training data for the machine learning process.

For example, the machine learning process can further involve an analysis of a status of the past parking space. The status can be one of occupied and unoccupied. Again, a product of the analysis can be training data for the machine learning process. For example, information about the status of the past parking space can be received from a system associated with the past area designated for parking. Additionally or alternatively, the information about the status of the past parking space can be determined from data produced by one or more sensors of the one or more vehicles.

For example, the analysis of: (1) the past vehicle trajectories, (2) the status of the past parking space, (3) the durations of the parking space identification processes, and (4) the characteristic can determine expected values of utility functions of the past parking space in which the status is unoccupied. For example, the analysis can determine the expected values of the utility functions based on a consideration of past vehicle trajectories that included an opportunity to select an unoccupied parking space as the parking space preferred by the occupant of the vehicle, but the opportunity was rejected. A rejection of the opportunity to select such an unoccupied parking space can be indicative of a situation in which the operator has an opinion about such an unoccupied parking space that is lower than an opinion of the operator for one or more other unoccupied parking spaces. For example, the analysis can distinguish the expected values of the utility functions based on associated durations of the parking space identification processes (e.g., the first model can be for the first duration and the second model can be for the second duration).

For example, the characteristic of the past area designated for parking can include one or more of: (1) a count of a total number of parking spaces of the past area designated for parking, (2) a count of a number of the parking spaces for which a status is unoccupied, (3) a count of a total number of electrical vehicle charging stations in the past area designated for parking, (4) a count of a number of the electrical vehicle charging stations in the past area designated for parking that are available for use, (5) a geographical location of the past area designated for parking, (6) a geographical location of an entrance of the past area designated for parking, (7) a geographical location of a point of interest in a vicinity of the past area designated for parking, (8) a fee associated with using the past area designated for parking, (9) a regulation associated with using the past area designated for parking, (10) a measurement of one or more evaluations of the past area designated for parking, (11) an average rate of arrival of vehicles to the past area designated for parking, (12) a measurement of an average size of the parking spaces, (13) a measurement of an ease of use of the parking spaces, (14) a recent history of counts of the number of the parking spaces for which the status is unoccupied, or (15) the like.

For example, the characteristic of the past parking space can include one or more of: (1) the status of the past parking space, (2) a recent history of the status of the past parking space, (3) an estimated time at which the status of the past parking space will be unoccupied, (4) an average rate of arrival of vehicles to the past parking space, (5) an existence of an electrical vehicle charging station at the past parking space, (6) a designation of the past parking space for use by a disabled person, (7) a designation of the past parking space for use by a compact vehicle, (8) a dimension of the past parking space, (9) a geographical location of the past parking space, (10) an existence of the past parking space within a field of view of a security camera, (11) a distance between an entrance of the past area designated for parking and the past parking space, (12) a distance of the past parking space from the security camera, (13) a distance of the past parking space from a street light, (14) a distance of the past parking space from an entrance of a structure associated with a destination of the operator, (15) an existence of a security feature in a vicinity of the past parking space, (16) a feature of the past parking space being that the past parking space is located at a corner of the past area designated for parking, (17) a measurement of an amount of traffic on a segment of a road, the segment being adjacent to the past parking space, (18) a status of a parking space, adjacent to the past parking space, being unoccupied, (19) a measurement of an ease of use of the past parking space, or (20) the like.

Although the disclosed technologies have been described with reference to a first model, a second model, a first duration, a second duration, a first threshold, and a second threshold, one of skill in the art understands, in light of the description herein, that the disclosed technologies can include additional models, additional durations, and additional thresholds. For example: (1) the preliminary operations module can include instructions that function to control the processor to obtain, for the operator of the vehicle, a third model for a third duration between the second threshold and a third threshold and (2) the communications module can include instructions that function to control the processor to communicate, to the component of the vehicle for the action, information to navigate to the parking space, the parking space being identified, in response to the current time being within the third duration, by the third model.

Figure 4:
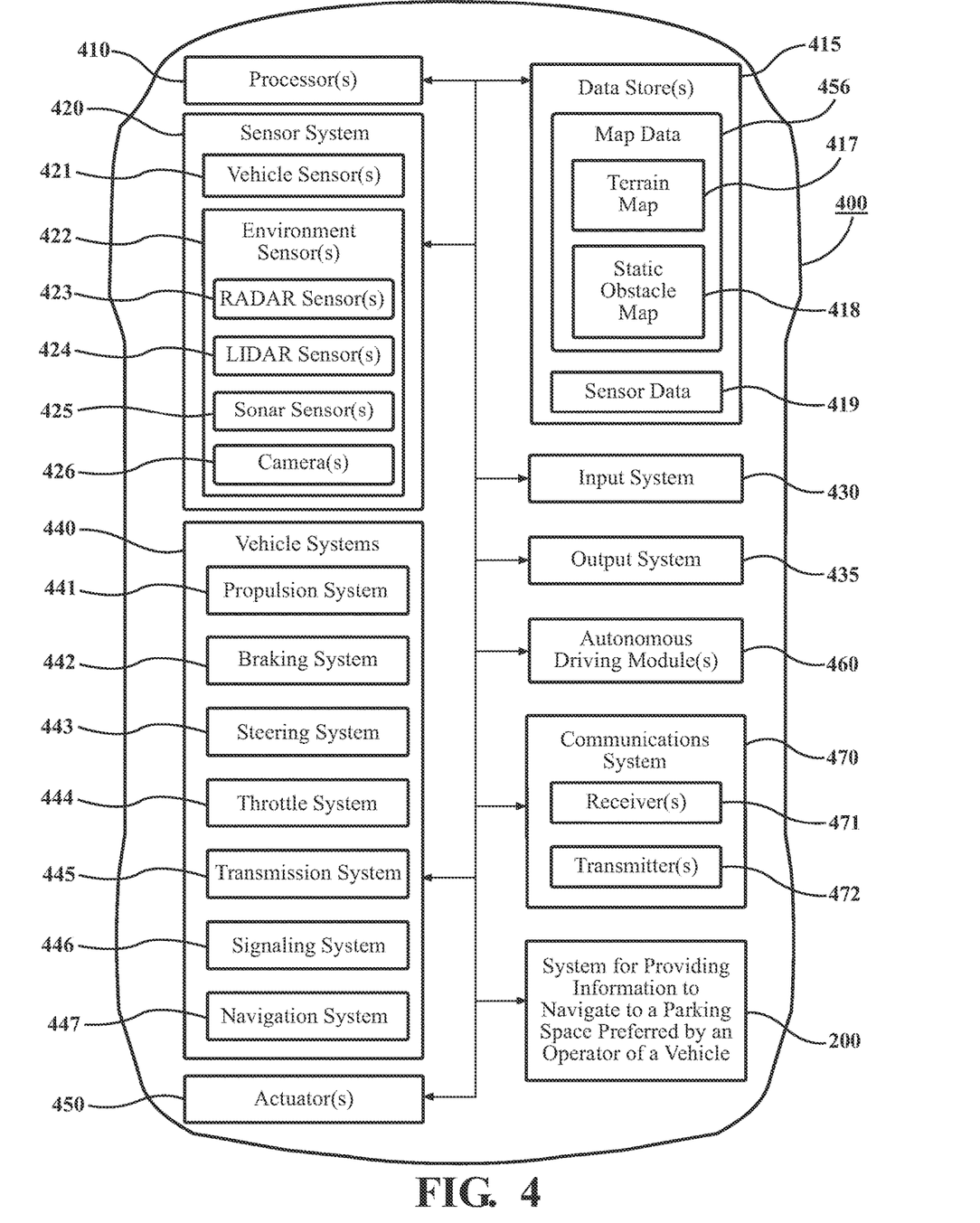
FIG. 4 includes a block diagram that illustrates an example of elements disposed on a vehicle, according to the disclosed technologies.

FIG. 4 includes a block diagram that illustrates an example of elements disposed on a vehicle 400, according to the disclosed technologies. As used herein, a "vehicle" can be any form of powered transport. In one or more implementations, the vehicle 400 can be an automobile. While arrangements described herein are with respect to automobiles, one of skill in the art understands, in light of the description herein, that embodiments are not limited to automobiles.

In some embodiments, the vehicle 400 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 400 is performed according to inputs received from a user (e.g., human driver). In one or more arrangements, the vehicle 400 can be a conventional vehicle that is configured to operate in only a manual mode.

In one or more embodiments, the vehicle 400 can be an automated vehicle. As used herein, "automated vehicle" can refer to a vehicle that operates in an automated mode. As used herein, "automated mode" can refer to navigating and/or maneuvering the vehicle 400 along a travel route using one or more computing systems to control the vehicle 400 with minimal or no input from a human driver. In one or more embodiments, the vehicle 400 can be highly automated or completely automated. In one embodiment, the vehicle 400 can be configured with one or more semi-automated operational modes in which one or more computing systems perform a portion of the navigation and/or maneuvering of the vehicle along a travel route, and a vehicle operator (i.e., driver) provides inputs to the vehicle 400 to perform a portion of the navigation and/or maneuvering of the vehicle 400 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 400 can include various elements. The vehicle 400 can have any combination of the various elements illustrated in FIG. 4. In various embodiments, it may not be necessary for the vehicle 400 to include all of the elements illustrated in FIG. 4. Furthermore, the vehicle 400 can have elements in addition to those illustrated in FIG. 4. While the various elements are illustrated in FIG. 4 as being located within the vehicle 400, one or more of these elements can be located external to the vehicle 400. Furthermore, the elements illustrated may be physically separated by large distances. For example, as described, one or more components of the disclosed system can be implemented within the vehicle 400 while other components of the system can be implemented within a cloud-computing environment, as described below. For example, the elements can include one or more processors 410, one or more data stores 415, a sensor system 420, an input system 430, an output system 435, vehicle systems 440, one or more actuators 450, one or more automated driving modules 460, a communications system 470, and the system 200 for providing information to navigate to a parking space preferred by an operator of a vehicle In one or more arrangements, the one or more processors 410 can be a main processor of the vehicle 400. For example, the one or more processors 410 can be an electronic control unit (ECU). For example, functions and/or operations of the processor 202 (illustrated in FIG. 2) can be realized by the one or more processors 410.

The one or more data stores 415 can store, for example, one or more types of data. The one or more data stores 415 can include volatile memory and/or non-volatile memory. For example, functions and/or operations of the memory 204 (illustrated in FIG. 2) can be realized by the one or more data stores 415. Examples of suitable memory for the one or more data stores 415 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 415 can be a component of the one or more processors 410. Additionally or alternatively, the one or more data stores 415 can be operatively connected to the one or more processors 410 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 415 can store map data 416. The map data 416 can include maps of one or more geographic areas. In some instances, the map data 416 can include information or data on roads, traffic control devices, road markings, structures, features, and/or landmarks in the one or more geographic areas. The map data 416 can be in any suitable form. In some instances, the map data 416 can include aerial views of an area. In some instances, the map data 416 can include ground views of an area, including 360-degree ground views. The map data 416 can include measurements, dimensions, distances, and/or information for one or more items included in the map data 416 and/or relative to other items included in the map data 416. The map data 416 can include a digital map with information about road geometry. The map data 416 can be high quality and/or highly detailed.

In one or more arrangements, the map data 416 can include one or more terrain maps 417. The one or more terrain maps 417 can include information about the ground, terrain, roads, surfaces, and/or other features of one or more geographic areas. The one or more terrain maps 417 can include elevation data of the one or more geographic areas. The map data 416 can be high quality and/or highly detailed. The one or more terrain maps 417 can define one or more ground surfaces, which can include paved roads, unpaved roads, land, and other things that define a ground surface.

In one or more arrangements, the map data 416 can include one or more static obstacle maps 418. The one or more static obstacle maps 418 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 418 can have location data, size data, dimension data, material data, and/or other data associated with them. The one or more static obstacle maps 418 can include measurements, dimensions, distances, and/or information for one or more static obstacles. The one or more static obstacle maps 418 can be high quality and/or highly detailed. The one or more static obstacle maps 418 can be updated to reflect changes within a mapped area.

In one or more arrangements, the one or more data stores 415 can store sensor data 419. As used herein, "sensor data" can refer to any information about the sensors with which the vehicle 400 can be equipped including the capabilities of and other information about such sensors. The sensor data 419 can relate to one or more sensors of the sensor system 420. For example, in one or more arrangements, the sensor data 419 can include information about one or more lidar sensors 424 of the sensor system 420.

In some arrangements, at least a portion of the map data 416 and/or the sensor data 419 can be located in one or more data stores 415 that are located onboard the vehicle 400. Alternatively or additionally, at least a portion of the map data 416 and/or the sensor data 419 can be located in one or more data stores 415 that are located remotely from the vehicle 400.

The sensor system 420 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 420 includes a plurality of sensors, the sensors can work independently from each other. Alternatively, two or more of the sensors can work in combination with each other. In such a case, the two or more sensors can form a sensor network. The sensor system 420 and/or the one or more sensors can be operatively connected to the one or more processors 410, the one or more data stores 415, and/or another element of the vehicle 400 (including any of the elements illustrated in FIG. 4). The sensor system 420 can acquire data of at least a portion of the external environment of the vehicle 400 (e.g., nearby vehicles). The sensor system 420 can include any suitable type of sensor. Various examples of different types of sensors are described herein. However, one of skill in the art understands that the embodiments are not limited to the particular sensors described herein.

The sensor system 420 can include one or more vehicle sensors 421. The one or more vehicle sensors 421 can detect, determine, and/or sense information about the vehicle 400 itself. In one or more arrangements, the one or more vehicle sensors 421 can be configured to detect and/or sense position and orientation changes of the vehicle 400 such as, for example, based on inertial acceleration. In one or more arrangements, the one or more vehicle sensors 421 can include one or more accelerometers, one or more gyroscopes, an inertial measurement unit (IMU), a dead-reckoning system, a global navigation satellite system (GNSS), a global positioning system (GPS), a navigation system 447, and/or other suitable sensors. The one or more vehicle sensors 421 can be configured to detect and/or sense one or more characteristics of the vehicle 400. In one or more arrangements, the one or more vehicle sensors 421 can include a speedometer to determine a current speed of the vehicle 400.

Alternatively or additionally, the sensor system 420 can include one or more environment sensors 422 configured to acquire and/or sense driving environment data. As used herein, "driving environment data" can include data or information about the external environment in which a vehicle is located or one or more portions thereof. For example, the one or more environment sensors 422 can be configured to detect, quantify, and/or sense obstacles in at least a portion of the external environment of the vehicle 400 and/or information/data about such obstacles. Such obstacles may be stationary objects and/or dynamic objects. The one or more environment sensors 422 can be configured to detect, measure, quantify, and/or sense other things in the external environment of the vehicle 400 such as, for example, lane markers, signs, traffic lights, traffic signs, lane lines, crosswalks, curbs proximate the vehicle 400, off-road objects, etc.

Various examples of sensors of the sensor system 420 are described herein. The example sensors may be part of the one or more vehicle sensors 421 and/or the one or more environment sensors 422. However, one of skill in the art understands that the embodiments are not limited to the particular sensors described.

In one or more arrangements, the one or more environment sensors 422 can include one or more radar sensors 423, one or more lidar sensors 424, one or more sonar sensors 425, and/or one or more cameras 426. In one or more arrangements, the one or more cameras 426 can be one or more high dynamic range (HDR) cameras or one or more infrared (IR) cameras. For example, the one or more cameras 426 can be used to record a reality of a state of an item of information that can appear in the digital map.

The input system 430 can include any device, component, system, element, arrangement, or groups thereof that enable information/data to be entered into a machine. The input system 430 can receive an input from a vehicle passenger (e.g., a driver or a passenger). The output system 435 can include any device, component, system, element, arrangement, or groups thereof that enable information/data to be presented to a vehicle passenger (e.g., a driver or a passenger).

Various examples of the one or more vehicle systems 440 are illustrated in FIG. 4. However, one of skill in the art understands that the vehicle 400 can include more, fewer, or different vehicle systems. Although particular vehicle systems can be separately defined, each or any of the systems or portions thereof may be otherwise combined or segregated via hardware and/or software within the vehicle 400. For example, the one or more vehicle systems 440 can include a propulsion system 441, a braking system 442, a steering system 443, a throttle system 444, a transmission system 445, a signaling system 446, and/or the navigation system 447. Each of these systems can include one or more devices, components, and/or a combination thereof, now known or later developed.

The navigation system 447 can include one or more devices, applications, and/or combinations thereof, now known or later developed, configured to determine the geographic location of the vehicle 400 and/or to determine a travel route for the vehicle 400. The navigation system 447 can include one or more mapping applications to determine a travel route for the vehicle 400. The navigation system 447 can include a global positioning system, a local positioning system, a geolocation system, and/or a combination thereof.

The one or more actuators 450 can be any element or combination of elements operable to modify, adjust, and/or alter one or more of the vehicle systems 440 or components thereof responsive to receiving signals or other inputs from the one or more processors 410 and/or the one or more automated driving modules 460. Any suitable actuator can be used. For example, the one or more actuators 450 can include motors, pneumatic actuators, hydraulic pistons, relays, solenoids, and/or piezoelectric actuators.

The one or more processors 410 and/or the one or more automated driving modules 460 can be operatively connected to communicate with the various vehicle systems 440 and/or individual components thereof. For example, the one or more processors 410 and/or the one or more automated driving modules 460 can be in communication to send and/or receive information from the various vehicle systems 440 to control the movement, speed, maneuvering, heading, direction, etc. of the vehicle 400. The one or more processors 410 and/or the one or more automated driving modules 460 may control some or all of these vehicle systems 440 and, thus, may be partially or fully automated.

The one or more processors 410 and/or the one or more automated driving modules 460 may be operable to control the navigation and/or maneuvering of the vehicle 400 by controlling one or more of the vehicle systems 440 and/or components thereof. For example, when operating in an automated mode, the one or more processors 410 and/or the one or more automated driving modules 460 can control the direction and/or speed of the vehicle 400. The one or more processors 410 and/or the one or more automated driving modules 460 can cause the vehicle 400 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The communications system 470 can include one or more receivers 471 and/or one or more transmitters 472. The communications system 470 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 470 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology). "Vehicle to Everything" (V2X) technology can integrate aspects of these individual communications technologies.

Moreover, the one or more processors 410, the one or more data stores 415, and the communications system 470 can be configured to one or more of form a micro cloud, participate as a member of a micro cloud, or perform a function of a leader of a mobile micro cloud. A micro cloud can be characterized by a distribution, among members of the micro cloud, of one or more of one or more computing resources or one or more data storage resources in order to collaborate on executing operations. The members can include at least connected vehicles.

The vehicle 400 can include one or more modules, at least some of which are described herein. The modules can be implemented as computer-readable program code that, when executed by the one or more processors 410, implement one or more of the various processes described herein. One or more of the modules can be a component of the one or more processors 410. Alternatively or additionally, one or more of the modules can be executed on and/or distributed among other processing systems to which the one or more processors 410 can be operatively connected. The modules can include instructions (e.g., program logic) executable by the one or more processors 410. Alternatively or additionally, the one or more data store 415 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 400 can include one or more automated driving modules 460. The one or more automated driving modules 460 can be configured to receive data from the sensor system 420 and/or any other type of system capable of capturing information relating to the vehicle 400 and/or the external environment of the vehicle 400. In one or more arrangements, the one or more automated driving modules 460 can use such data to generate one or more driving scene models. The one or more automated driving modules 460 can determine position and velocity of the vehicle 400. The one or more automated driving modules 460 can determine the location of obstacles, obstacles, or other environmental features including traffic signs, trees, shrubs, neighboring vehicles, pedestrians, etc.

The one or more automated driving modules 460 can be configured to receive and/or determine location information for obstacles within the external environment of the vehicle 400 for use by the one or more processors 410 and/or one or more of the modules described herein to estimate position and orientation of the vehicle 400, vehicle position in global coordinates based on signals from a plurality of satellites, or any other data and/or signals that could be used to determine the current state of the vehicle 400 or determine the position of the vehicle 400 with respect to its environment for use in either creating a map or determining the position of the vehicle 400 in respect to map data.

The one or more automated driving modules 460 can be configured to determine one or more travel paths, current automated driving maneuvers for the vehicle 400, future automated driving maneuvers and/or modifications to current automated driving maneuvers based on data acquired by the sensor system 420, driving scene models, and/or data from any other suitable source such as determinations from the sensor data 419. As used herein, "driving maneuver" can refer to one or more actions that affect the movement of a vehicle. Examples of driving maneuvers include: accelerating, decelerating, braking, turning, moving in a lateral direction of the vehicle 400, changing travel lanes, merging into a travel lane, and/or reversing, just to name a few possibilities. The one or more automated driving modules 460 can be configured to implement determined driving maneuvers. The one or more automated driving modules 460 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 460 can be configured to execute various vehicle functions and/or to transmit data to, receive data from, interact with, and/or control the vehicle 400 or one or more systems thereof (e.g., one or more of vehicle systems 440). For example, functions and/or operations of an automotive navigation system can be realized by the one or more automated driving modules 460.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-4, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory storing:
    a preliminary operations module including instructions that, when executed by the processor, cause the processor to obtain:
        a first model for a first duration between a commencement of a parking space identification process and a first threshold, the first model reflecting an opinion of an operator of an automated vehicle about a parking space during the first duration; and
        a second model for a second duration between the first threshold and a second threshold, the second model reflecting an opinion of the operator about the parking space during the second duration,
        wherein:
            at least one of the first model or the second model was produced by a machine learning process, and
            the machine learning process involves an analysis of at least one of:
                past vehicle trajectories that included a rejected opportunity to select an unoccupied parking space, or
                durations of the parking space identification processes in which the durations commenced at times at which at least one vehicle, in which the operator is an operator of the at least one vehicle, entered a designated parking area;
    an execution module including instructions that, when executed by the processor, cause the processor to execute, based on a current time, at least one of the first model or the second model to identify a parking space preferred by the operator of the automated vehicle; and
    a communications module including instructions that, when executed by the processor, cause the processor to communicate, to a component of the automated vehicle for an action and based on a result produced by the at least one of the first model or the second model, information to navigate to the parking space preferred by the operator of the automated vehicle, the parking space preferred by the operator of the automated vehicle being identified, in response to the current time being within:
        the first duration, by the first model; and
        the second duration, by the second model,
    wherein:
        the component comprises at least one of a propulsion system, a braking system, a steering system, a throttle system, a transmission system, or a navigation system; and
        the action is to cause the automated vehicle to be navigated to the parking space preferred by the operator of the automated vehicle.

2. The system of claim 1, wherein:
the parking space is located in an area designated for parking,
the preliminary operations module further includes instructions that, when executed by the processor, cause the processor to obtain information about statuses of parking spaces in the area designated for parking, a status, of the statuses, being one of occupied and unoccupied, and
the instructions to execute, based on the current time, the at least one of the first model or the second model to identify the parking space preferred by the operator of the automated vehicle include instructions to execute, based on the current time and for the parking spaces in which the statuses are unoccupied, the at least one of the first model or the second model to identify the parking space preferred by the operator of the automated vehicle.

3. The system of claim 2, wherein the system is disposed on a server.

4. The system of claim 3, wherein the instructions to obtain the first model and the second model include instructions to receive, from the automated vehicle, the first model and the second model.

5. The system of claim 2, wherein the system is disposed on the automated vehicle.

6. The system of claim 5, wherein the instructions to obtain the information about the statuses of the parking spaces in the area designated for parking include instructions to receive, from a system associated with the area designated for parking, the information about the statuses of the parking spaces in the area designated for parking.

7. The system of claim 2, wherein the instructions to execute the at least one of the first model or the second model to identify the parking space preferred by the operator of the automated vehicle include instructions to:
execute the at least one of the first model or the second model to produce at least one list of parking spaces;
determine, for each parking space on the at least one list of parking spaces, a value of a utility function associated with the at least one of the first model or the second model; and
identify the parking space preferred by the operator of the automated vehicle as a parking space, of the parking spaces on the at least one list of parking spaces, for which the value of the utility function is a highest value.

8. The system of claim 7, wherein:
the current time is a first time,
the instructions to identify the parking space preferred by the operator of the automated vehicle include instructions to identify a first parking space, of the parking spaces on a first list of parking spaces of the at least one list of parking spaces, for which the value of the utility function is the highest value, the first list of parking spaces having been produced from an execution of the first model, and
the instructions to execute the at least one of the first model or the second model to identify the parking space preferred by the operator of the automated vehicle further include instructions to:
 receive, at a second time, a signal that indicates that the first parking space is occupied; and
 identify, in response to the second time being within:
  the first duration, the parking space preferred by the operator of the automated vehicle as a second parking space, of the parking spaces on a second list of parking spaces of the at least one list of parking spaces, for which the value of the utility function is the highest value; and
  the second duration, the parking space preferred by the operator of the automated vehicle as a third parking space, of the parking spaces on a third list of parking spaces of the at least one list of parking spaces, for which the value of the utility function is the highest value, the second list of parking spaces having been produced from an execution of the second model.

9. The system of claim 1, completions of the parking space identification processes are at times at which a source of a propulsion force for the at least one vehicle is in an off state.

10. The system of claim 1, wherein the machine learning process further involves an analysis of a status of the past parking space, the status being one of occupied and unoccupied.

11. The system of claim 10, wherein the analysis of the past vehicle trajectories, the status of the past parking space, the durations of the parking space identification processes, and the characteristic determines expected values of utility functions of the past parking space in which the status is unoccupied.

12. The system of claim 11, wherein the analysis determines the expected values of the utility functions based on a consideration of the past vehicle trajectories that included the rejected opportunity to select the unoccupied parking space.

13. The system of claim 12, wherein the analysis distinguishes the expected values of the utility functions based on associated durations of the parking space identification processes.

14. The system of claim 10, wherein the machine learning process further involves an analysis of a characteristic of a past area designated for parking, and the characteristic of the past area designated for parking comprises at least one of:
 a count of a total number of parking spaces of the past area designated for parking,
 a count of a number of the parking spaces for which a status is unoccupied,
 a count of a total number of electrical vehicle charging stations in the past area designated for parking,
 a count of a number of the electrical vehicle charging stations in the past area designated for parking that are available for use,
 a geographical location of the past area designated for parking,
 a geographical location of an entrance of the past area designated for parking,
 a geographical location of a point of interest in a vicinity of the past area designated for parking,
 a fee associated with using the past area designated for parking,
 a regulation associated with using the past area designated for parking,
 a measurement of at least one evaluation of the past area designated for parking,
 an average rate of arrival of vehicles to the past area designated for parking,
 a measurement of an average size of the parking spaces,
 a measurement of an ease of use of the parking spaces, or
 a recent history of counts of the number of the parking spaces for which the status is unoccupied.

15. The system of claim 10, wherein the machine learning process further involves an analysis of a characteristic of a past parking space of the past area designated for parking, and the characteristic of the past parking space comprises at least one of:
 the status of the past parking space,
 a recent history of the status of the past parking space,
 an estimated time at which the status of the past parking space will be unoccupied,
 an average rate of arrival of vehicles to the past parking space,
 an existence of an electrical vehicle charging station at the past parking space,
 a designation of the past parking space for use by a disabled person,
 a designation of the past parking space for use by a compact vehicle,
 a dimension of the past parking space,
 a geographical location of the past parking space,
 an existence of the past parking space within a field of view of a security camera,
 a distance between an entrance of the past area designated for parking and the past parking space,
 a distance of the past parking space from the security camera,
 a distance of the past parking space from a street light,
 a distance of the past parking space from an entrance of a structure associated with a destination of the operator,
 an existence of a security feature in a vicinity of the past parking space,
 a feature of the past parking space being that the past parking space is located at a corner of the past area designated for parking,
 a measurement of an amount of traffic on a segment of a road, the segment being adjacent to the past parking space,
 a status of a parking space, adjacent to the past parking space, being unoccupied, or
 a measurement of an ease of use of the past parking space.

16. A method, comprising:
 obtaining, by a processor:
  a first model for a first duration between a commencement of a parking space identification process and a first threshold, the first model reflecting an opinion of an operator of an automated vehicle about a parking space during the first duration; and
  a second model for a second duration between the first threshold and a second threshold, the second model reflecting an opinion of the operator about the parking space during the second duration, wherein:
   at least one of the first model or the second model was produced by a machine learning process, and
   the machine learning process involves an analysis of at least one of:
    past vehicle trajectories that included a rejected opportunity to select an unoccupied parking space, or
    durations of the parking space identification processes in which the durations commenced at times at which at least one vehicle, in which the operator is an operator of the at least one vehicle, entered a designated parking area;

executing, by the processor and based on a current time, at least one of the first model or the second model to identify a parking space preferred by the operator of the automated vehicle; and communicating, by the processor and to a component of the automated vehicle for an action and based on a result produced by the at least one of the first model or the second model, information to navigate to the parking space preferred by the operator of the automated vehicle, the parking space preferred by the operator of the automated vehicle being identified, in response to the current time being within:

the first duration, by the first model; and
the second duration, by the second model,
wherein:
the component comprises at least one of a propulsion system, a braking system, a steering system, a throttle system, a transmission system, or a navigation system; and
the action is to cause the automated vehicle to be navigated to the parking space preferred by the operator of the automated vehicle.

17. The method of claim 16, wherein the parking space is located in an area designated for parking.

18. The method of claim 16, wherein both the first model and the second model were produced by the machine learning process.

19. A non-transitory computer-readable medium for providing information to navigate to a parking space preferred by an operator of an automated vehicle, the non-transitory computer-readable medium including instructions that, when executed by one or more processors, cause the one or more processors to:
obtain:
a first model for a first duration between a commencement of a parking space identification process and a first threshold, the first model reflecting an opinion of an operator of an automated vehicle about the parking space during the first duration; and
a second model for a second duration between the first threshold and a second threshold, the second model reflecting an opinion of the operator about the parking space during the second duration, wherein:
at least one of the first model or the second model was produced by a machine learning process, and
the machine learning process involves an analysis of at least one of:
past vehicle trajectories that included a rejected opportunity to select an unoccupied parking space, or
durations of the parking space identification processes in which the durations commenced at times at which at least one vehicle, in which the operator is an operator of the at least one vehicle, entered a designated parking area;

execute, based on a current time, at least one of the first model or the second model to identify a parking space preferred by the operator of the automated vehicle; and communicate, to a component of the automated vehicle for an action and based on a result produced by the at least one of the first model or the second model, information to navigate to the parking space preferred by the operator of the automated vehicle, the parking space preferred by the operator of the automated vehicle being identified, in response to the current time being within:

the first duration, by the first model; and
the second duration, by the second model,
wherein:
the component comprises at least one of a propulsion system, a braking system, a steering system, a throttle system, a transmission system, or a navigation system; and
the action is to cause the automated vehicle to be navigated to the parking space preferred by the operator of the vehicle.

20. A system, comprising:
a processor; and
a memory storing a module including instructions that cause the processor to:
determine that a current time is, since a commencement of a parking space identification process, within a first time duration or a second time duration;
execute, based on the current time being within:
the first time duration, a first model, or
the second time duration, a second model,
to identify a preferred parking space of an operator of an automated vehicle,
wherein at least one of the first model or the second mode was produced by a machine learning process that involved an analysis of at least one of:
past vehicle trajectories that included a rejected opportunity to select an unoccupied parking space, or
durations of the parking space identification processes in which the durations commenced at times at which at least one vehicle, in which the operator is an operator of the at least one vehicle, entered a designated parking area; and
cause, based on a result produced by the at least one of the first model or the second model, the automated vehicle to be navigated to the preferred parking space.

* * * * *